J. B. EDSON.
Recording Steam-Gages.
No. 145,495. Patented Dec. 16, 1873.
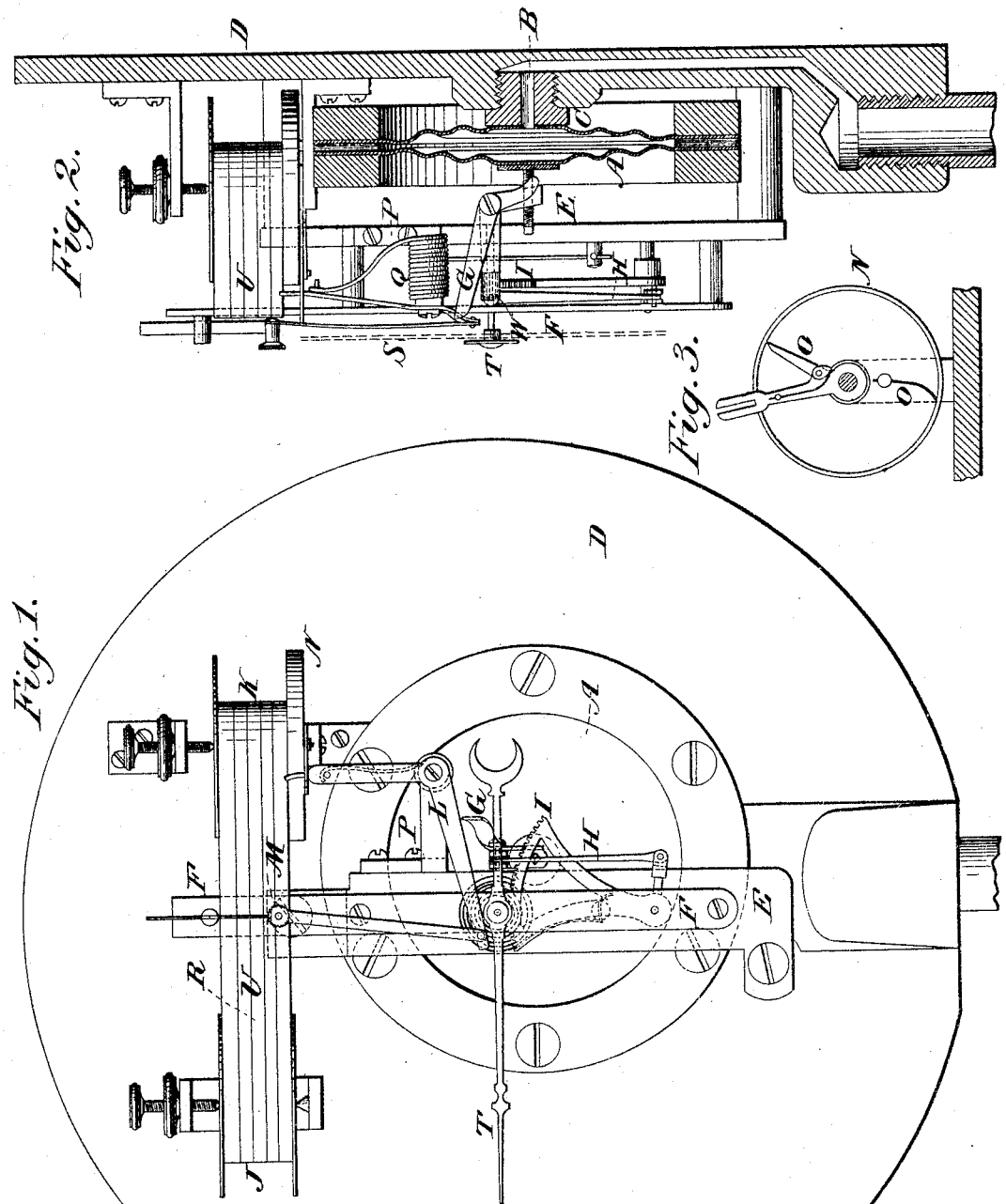

UNITED STATES PATENT OFFICE.

JARVIS B. EDSON, OF BROOKLYN, NEW YORK.

IMPROVEMENT IN RECORDING STEAM-GAGES.

Specification forming part of Letters Patent No. 145,495, dated December 16, 1873; application filed June 27, 1871.

*To all whom it may concern:*

Be it known that I, JARVIS B. EDSON, of the city of Brooklyn, in the county of Kings and State of New York, have invented an Improved Locomotive Recording Steam-Gage, of which the following is a specification:

My invention indicates all degrees of pressure in a boiler (or other reservoir) upon an ordinary dial-plate. It records upon a strip of paper, continuously, all degrees of pressure which exceed any prescribed limit, and only such excessive pressure. Reliable data are thus afforded, to be preserved for reference, when required; as, for instance, to compare work performed by different engineers, or for economical or scientific purposes, or legal investigation in case of disaster.

The following is a full description of the same, reference being had to the accompanying drawings, in which—

Figure 1 is a front view of gage, showing the indicating and recording apparatus. Fig. 2 is a side elevation, showing the cross-section of springs A, and manner of connecting the same to case. Fig. 3 shows flange N in detail.

Similar letters in each figure indicate the same parts.

In the drawings, A is a pair of corrugated diaphragm steel springs, so combined as, when inflated, to impart motion to the attached mechanism proportionate to the displacement or travel of both springs. The center of the lower spring is secured around the opening of the channel-way B, at the lug C. Upon the metallic back D of the case are attached two bearings, E a lower and F an upper, for supporting the moving parts. To the lower bearing E are attached rocking levers G G, which move, by means of the connecting-rod H, the segmental rack I, and pinion W, the pointer T in front of the dial-plate S. The shoulder on rocking lever G is for the purpose of moving the recording apparatus. J is a reservoir-reel, K a receiving-reel. L is a compound lever, one arm of which moves the spring pencil-holder M, the other moving the pawl of the receiving-reel K. The reels J and K are suspended between centers supported on brackets. The lower flange N of the receiving-reel K is recessed on its under side, to receive the small pawls O O, one of which gives forward motion to the reel, while the other prevents its recoil. The reel K is detachable from the flange N, which is secured to, and turns on, a center in the lower bracket. P is a stud on the lower bearing E, and supports the recoil-spring Q. A paper chart, U, is shown extended from reel J to reel K, passing under the pencil-point M, over the bearing F. R is a vertical scale of degrees of pressure corresponding with those on the dial-plate S, for convenience in marking the pressure on the chart before removing it.

The operation is as follows: The steam or other fluid or liquid, upon being admitted through the pipe V and channel-way B, inflates the springs A, operates the rocking lever connected with the segmental rack I and pinion W, thus turning the pointer T, and indicating the pressure before the dial. The pressure having reached any prescribed limit, the upper end of the rocking lever G moves the pencil-carrying lever L, and causes the pencil M to record on the chart U the increasing pressure, while the paper is drawn simultaneously around the reel K by means of lever L acting upon pawls O O.

By the peculiar arrangement of these pawls, as already described, the paper remains stationary during the reduction of pressure.

I claim as my invention—

1. The adaptation and application, in circular dial-gages for recording or indicating pressure by hand and dial-plate, of two corrugated diaphragm steel disks or springs, connected together by iron compression-rings, screws, and packing on their outer edges, and receiving the pressure between them through an opening in the center of the back spring, where it is attached to the case, substantially as shown and described.

2. The combination and arrangement of the recording-pencil M, chart U, and reels J and K, with the arm or lever L, operated by contact with the pin or shoulder of the rocking lever G G, whereby an intermittent motion is given to the apparatus, and records of excessive pressure only are obtained.

3. The combination of apparatus, as shown and described, by which a record is given of all pressure in excess of a fixed limit, simultaneously with the indication of such pressure on the dial-plate by a hand, which also indicates all pressures below that limit.

JARVIS B. EDSON.

Witnesses:
WILLIAM C. LUSK,
WILLIAM H. CLARKSON.